---

UNITED STATES PATENT OFFICE.

EUGENE AUGÉ, OF MONTPELLIER, FRANCE.

PROCESS OF MAKING SODA-ALUM.

SPECIFICATION forming part of Letters Patent No. 420,488, dated February 4, 1890.

Application filed June 12, 1889. Serial No. 314,024. (No specimens.) Patented in France February 16, 1889, No. 196,123.

*To all whom it may concern:*

Be it known that I, EUGENE AUGÉ, a citizen of the Republic of France, and a resident of Montpellier, France, have invented a certain new and useful Process for Making Soda-Alum in Crystallized Form, (for which I have obtained a patent in France, No. 196,123, dated February 16, 1889,) whereof the following is a specification.

In ordinary practice when a solution of sulphate of soda is mixed with a solution of sulphate of alumina the resultant soda-alum does not crystallize. This is due to the fact that the quantity of water necessary to obtain these two sulphates in the form of solutions exceeds the constituent water of soda-alum, and as this alum is highly soluble in water it remains in solution in the excess of liquid. If the solution of soda-alum is evaporated by ordinary processes, it is necessary to carry the temperature above 70° or 80° centigrade, sometimes even ebullition taking place, and the aluminous solution thus heated loses its capacity for crystallization.

It is the object of my invention to overcome this difficulty and to make commercially a soda-alum in the form of crystals. To this end I combine in solution sulphate of alumina and sulphate of soda in proper proportions, the solution being as far as possible free from iron. I then evaporate the resultant solution in a vacuum apparatus, using any of the well-known forms of such apparatus which is found convenient for the purpose, taking care that the temperature always remains below 60° centigrade. For practical purposes I deem it best to carry on the process at about 48° centigrade; but I do not, of course, limit myself to that precise temperature. When the solution has been sufficiently condensed—that is to say, when it reaches while still hot a density preferably between 1.38° and 1.46—I draw it off into a crystallizing-tank. The degree of density to which the solution has been reduced by the foregoing process determines the character of the crystals which will result, the density being taken as greater or less, according to whether abundance or size, respectively, be sought for. The crystals thus formed upon the cooling of the solution are taken out, washed, preferably, by means of a rose-sprinkler, and are immediately packed in closed vessels to prevent efflorescence, which would otherwise take place after a time. The mother-liquor is then drawn off, and may be reused, either separately or by adding a new charge of sulphate of soda and sulphate of alumina in proper proportions, to be again treated in the vacuum apparatus, as above mentioned.

Having thus described my invention, I claim as an improvement in the manufacture of soda-alum—

The hereinbefore-described process of evaporating *in vacuo* a solution of sulphate of soda combined with a solution of sulphate of alumina at a temperature not substantially exceeding 60° centigrade, and then cooling the condensed solution to form crystals, substantially as set forth.

EUGENE AUGÉ.

Witnesses:
LOUIS VALALZ,
S. MARTINNEY.